US009815450B2

(12) United States Patent
Kim

(10) Patent No.: US 9,815,450 B2
(45) Date of Patent: Nov. 14, 2017

(54) METHOD AND APPARATUS FOR GENERATING TORQUE COMMAND

(71) Applicant: Hyundai Motor Company, Seoul (KR)

(72) Inventor: Do Hee Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/807,468

(22) Filed: Jul. 23, 2015

(65) Prior Publication Data

US 2016/0257291 A1    Sep. 8, 2016

(30) Foreign Application Priority Data

Mar. 2, 2015 (KR) .................. 10-2015-0029317

(51) Int. Cl.
*B60W 10/00* (2006.01)
*B60W 20/10* (2016.01)
(Continued)

(52) U.S. Cl.
CPC ............ *B60W 20/10* (2013.01); *B60W 10/06* (2013.01); *B60W 10/08* (2013.01); *B60K 2006/4825* (2013.01); *B60W 2510/0638* (2013.01); *B60W 2510/081* (2013.01); *B60W 2510/244* (2013.01); *B60W 2520/10* (2013.01); *B60W 2540/10* (2013.01); *B60W 2540/12* (2013.01);
(Continued)

(58) Field of Classification Search
CPC ...... B60W 20/10; B60W 10/06; B60W 10/08; B60W 2710/0666; B60W 2710/083; Y10S 903/93
See application file for complete search history.

(56) References Cited

U.S. PATENT DOCUMENTS 6,178,370 B1 * 1/2001 Zierolf .................. B60T 8/1703
188/181 A
2001/0039230 A1 * 11/2001 Severinsky ............ B60H 1/004
477/3
(Continued)

FOREIGN PATENT DOCUMENTS

JP         EP 2426382 A1 *  3/2012  ............ B60W 10/06

*Primary Examiner* — Behrang Badii
*Assistant Examiner* — Daniel L Greene
(74) *Attorney, Agent, or Firm* — Mintz Levin Cohn Ferris Glovsky and Popeo, P.C.; Peter F. Corless

(57) ABSTRACT

A method for generating torque commands includes: setting a threshold increase rate and a threshold decrease rate of an initial torque command according to performance of a torque source; comparing an increase rate of the initial torque command with the threshold increase rate, while generating a final torque command based on the initial torque command; determining a first time at which the increase rate of the initial torque command reaches the threshold increase rate, and generating the final torque command which increases according to the threshold increase rate after the first time, when the increase rate of the initial torque command is greater than the threshold increase rate; determining a second time at which the final torque command reaches the initial torque command, and calculating a torque loss amount between the first time and the second time, when the final torque command reaches the initial torque command after the first time; and generating the final torque command for correcting the torque loss amount after the second time.

20 Claims, 7 Drawing Sheets

(51) Int. Cl.
*B60W 10/06* (2006.01)
*B60W 10/08* (2006.01)
*B60K 6/48* (2007.10)

(52) U.S. Cl.
CPC .............. *B60W 2710/0666* (2013.01); *B60W 2710/083* (2013.01); *Y02T 10/6252* (2013.01); *Y02T 10/6286* (2013.01); *Y10S 903/93* (2013.01)

(56) References Cited

U.S. PATENT DOCUMENTS

| | | | | |
|---|---|---|---|---|
| 2008/0119319 A1* | 5/2008 | Kaya | .................. | B60K 6/445 477/3 |
| 2008/0308066 A1* | 12/2008 | Martin | .................. | B60K 6/365 123/403 |
| 2012/0323401 A1* | 12/2012 | McGrogan | ............. | B60K 6/365 701/1 |
| 2015/0151732 A1* | 6/2015 | Kim | .................. | B60W 10/02 701/68 |

* cited by examiner

METHOD AND APPARATUS FOR GENERATING TORQUE COMMAND

CROSS-REFERENCE TO RELATED APPLICATION

This application claims priority to and the benefit of Korean Patent Application No. 10-2015-0029317 filed in the Korean Intellectual Property Office on Mar. 2, 2015, the entire contents of which are incorporated herein by reference.

BACKGROUND (a) Technical Field

The present disclosure relates generally to a method and an apparatus for generating a torque command and, more particularly, to a method and an apparatus for generating a torque command capable of correcting a torque loss amount and a torque excess amount due to a threshold increase rate and a threshold decrease rate.

(b) Description of the Related Art

As is generally known in the art, a hybrid electric vehicle uses an internal combustion engine and a battery power source together. The hybrid electric vehicle efficiently combines the torque from the internal combustion engine and torque from the motor.

In general, a hybrid electric vehicle includes an engine, a motor, an engine clutch controlling torque between the engine and the motor, a transmission, a differential gear device, a high voltage battery, a hybrid starter & generator (HSG) starting the engine or generating power according to output of the engine, and wheels. The HSG may refer to an integrated starter & generator (ISG).

Additionally, a hybrid electric vehicle enables driving in an electric vehicle (EV) mode, in which only torque of the motor is used; a hybrid electric vehicle (HEV) mode, in which torque of the engine is used as main torque and torque of the motor is used as auxiliary torque; and a regenerative braking mode, in which braking and inertial energy are recovered through electrical power generation of the motor during braking of the vehicle or during driving of the vehicle by inertia to be charged in the battery. The HEV mode is enabled by engaging or releasing the engine clutch depending a manipulation of an accelerator pedal or a brake pedal by a driver, a vehicle speed, a state of charge (SOC) of the battery, and the like. By using both mechanical energy of the engine and electrical energy of the battery, using optimal operation regions of the engine and the motor, and recovering the energy upon braking, fuel efficiency in a hybrid electric vehicle may be improved and the energy of the hybrid electric vehicle may be efficiently used.

A torque source, such as the engine, the motor, or the HSG, generates torque based on a torque command. In the case of the hybrid electric vehicle, an engine torque command and a motor torque command are determined based on a vehicle speed, a position of the accelerator pedal (i.e., pushed degree of the accelerator pedal), an engine speed, a motor speed, and the like. However, due to a performance limitation of the torque source (e.g., a tension limitation of a belt connecting the engine and the HSG, and a bandwidth of the motor), torque corresponding to a torque command may not be able to be generated. An increase rate and a decrease rate of the torque command are limited in order to prevent the torque source from being damaged.

In this regard, FIG. 7 is a graph illustrating a conventional HSG torque command. As shown in FIG. 7, when torque of the HSG is rapidly increased or decreased, a threshold increase rate and a threshold decrease rate are applied to the HSG torque command, i.e., since the belt connecting the engine and the HSG may be snapped. As a result, performance and behavior of the HSG is deteriorated since a torque loss amount and a torque excess amount are generated.

The above information disclosed in this Background section is only for enhancement of understanding of the background of the disclosure, and therefore, it may contain information that does not form the related art that is already known to a person of ordinary skill in the art.

SUMMARY OF THE DISCLOSURE

The present disclosure has been made in an effort to provide a method and an apparatus for generating a torque command capable of correcting a torque loss amount and a torque excess amount due to a threshold increase rate and a threshold decrease rate.

According to embodiments of the present disclosure, a method for generating torque commands includes: setting a threshold increase rate and a threshold decrease rate of an initial torque command according to performance of a torque source; comparing an increase rate of the initial torque command with the threshold increase rate, while generating a final torque command based on the initial torque command; determining a first time at which the increase rate of the initial torque command reaches the threshold increase rate, and generating the final torque command which increases according to the threshold increase rate after the first time, when the increase rate of the initial torque command is greater than the threshold increase rate; determining a second time at which the final torque command reaches the initial torque command, and calculating a torque loss amount between the first time and the second time, when the final torque command reaches the initial torque command after the first time; and generating the final torque command for correcting the torque loss amount after the second time.

The generating of the final torque command for correcting the torque loss amount after the second time may include: calculating i) a third time after the second time, ii) a fourth time at which the final torque command reaches the initial torque command after the third time, iii) the final torque command at the third time, and iv) the final torque command at the fourth time, based on the torque loss amount, the second time, the final torque command at the second time, a change rate of the initial torque command at the second time, a preset increase rate, and a preset decrease rate; comparing the final torque command at the third time with a maximum allowable torque command; and generating the final torque command between the second time and the fourth time based on the third time, the fourth time, the final torque command at the third time, and the final torque command at the fourth time, when the final torque command at the third time is less than or equal to the maximum allowable torque command.

The calculating of the third time after the second time, the fourth time at which the final torque command reaches the initial torque command after the third time, the final torque command at the third time, and the final torque command at the fourth time may include forming a virtual triangle having an area corresponding to the torque loss amount based on the second time, the third time, the fourth time, the final torque command at the second time, the final torque command at the third time, and the final torque command at the fourth time.

The generating of the final torque command between the second time and the fourth time using the third time, the fourth time, the final torque command at the third time, and the final torque command at the fourth time may include: generating the final torque command which increases according to the preset increase rate between the second time and the third time; and generating the final torque command which decreases according to the preset decrease rate between the third time and the fourth time.

The present increase rate may be the same as the threshold increase rate.

The preset decrease rate may be the same as the threshold decrease rate.

The generating of the final torque command for correcting the torque loss amount after the second time may further include: calculating a fifth time at which the final torque command reaches the maximum allowable torque command and a sixth time between the third time and the fourth time, when the final torque command at the third time is greater than the maximum allowable torque command; and generating the final torque command between the second time and the fourth time based on the fourth time, the fifth time, the sixth time, and the final torque command at the fourth time.

The calculating of the fifth time at which the final torque command reaches the maximum allowable torque command and the sixth time between the third time and the fourth time may include forming a virtual quadrangle having an area corresponding to the torque loss amount based on the second time, the fourth time, the fifth time, the sixth time, the final torque command at the second time, the maximum allowable torque command, and the final torque command at the fourth time.

The generating of the final torque command between the second time and the fourth time based on the fourth time, the fifth time, the sixth time, and the final torque command at the fourth time may include: generating the final torque command which increases according to the preset increase rate between the second time and the fifth time; generating the final torque command which corresponds to the maximum allowable torque command between the fifth time and the sixth time; and generating the final torque command which decreases according to the preset decrease rate between the sixth time and the fourth time.

Furthermore, according to embodiments of the present disclosure, a method for generating torque commands includes: setting a threshold increase rate and a threshold decrease rate of an initial torque command according to performance of a torque source; comparing a decrease rate of the initial torque command with the threshold decrease rate, while generating a final torque command based on the initial torque command; determining a first time at which the decrease rate of the initial torque command reaches the threshold decrease rate, and generating the final torque command which decreases according to the threshold decrease rate after the first time, when the decrease rate of the initial torque command is less than the threshold decrease rate; determining a second time at which the final torque command reaches the initial torque command, and calculating a torque excess amount between the first time and the second time, when the final torque command reaches the initial torque command after the first time; and generating the final torque command for correcting the torque excess amount after the second time.

The generating of the final torque command for correcting the torque excess amount after the second time may include: calculating i) a third time after the second time, ii) a fourth time at which the final torque command reaches the initial torque command after the third time, iii) the final torque command at the third time, and iv) the final torque command at the fourth time, based on the torque excess amount, the second time, the final torque command at the second time, a change rate of the initial torque command at the second time, a preset increase rate, and a preset decrease rate; comparing the final torque command at the third time with a minimum allowable torque command; and generating the final torque command between the second time and the fourth time based on the third time, the fourth time, the final torque command at the third time, and the final torque command at the fourth time, when the final torque command at the third time is greater than or equal to the minimum allowable torque command.

The calculating of the third time after the second time, the fourth time at which the final torque command reaches the initial torque command after the third time, the final torque command at the third time, and the final torque command at the fourth time may include forming a virtual triangle having an area corresponding to the torque excess amount based on the second time, the third time, the fourth time, the final torque command at the second time, the final torque command at the third time, and the final torque command at the fourth time.

The generating of the final torque between the second time and the fourth time using the third time, the fourth time, the final torque command at the third time, and the final torque command at the fourth time may include: generating the final torque command which decreases according to the preset decrease rate between the second time and the third time; and generating the final torque command which increases according to the preset increase rate between the third time and the fourth time.

The preset increase rate may be the same as the threshold increase rate.

The preset decrease rate may be the same as the threshold decrease rate.

The generating of the final torque command for correcting the torque excess amount after the second time may further include: calculating a fifth time at which the final torque command reaches the minimum allowable torque command and a sixth time between the third time and the fourth time, when the final torque command at the third time is less than the minimum allowable torque command; and generating the final torque command between the second time and the fourth time based on the fourth time, the fifth time, the sixth time, and the final torque command at the fourth time.

The calculating of the fifth time at which the final torque command reaches the minimum allowable torque command and the sixth time between the third time and the fourth time may include forming a virtual quadrangle having an area corresponding to the torque excess amount based on the second time, the fourth time, the fifth time, the sixth time, the final torque command at the second time, the minimum allowable torque command, and the final torque command at the fourth time.

The generating of the final torque command between the second time and the fourth time based on the fourth time, the fifth time, the sixth time, and the final torque command at the fourth time may include: generating the final torque command which decreases according to the preset decrease rate between the second time and the fifth time; generating the final torque command which corresponds to the minimum allowable torque command between the fifth time and the sixth time; and generating the final torque command which increases according to the preset increase rate between the sixth time and the fourth time.

Furthermore, according to embodiments of the present disclosure, an apparatus for generating torque commands includes: a data detector detecting data for generating torque commands; and a controller executing a predetermined program to control a torque source based on the data, where the predetermined program embodies a series of commands for performing either of the above-described method for generating the torque commands.

As described above, according to the present disclosure, torque commands that are capable of correcting the torque loss amount and the torque excess amount due to the threshold increase rate and the threshold decrease rate may be generated. Accordingly, superior performance of the torque source can be achieved.

DESCRIPTION OF SYMBOLS

Figure 1:
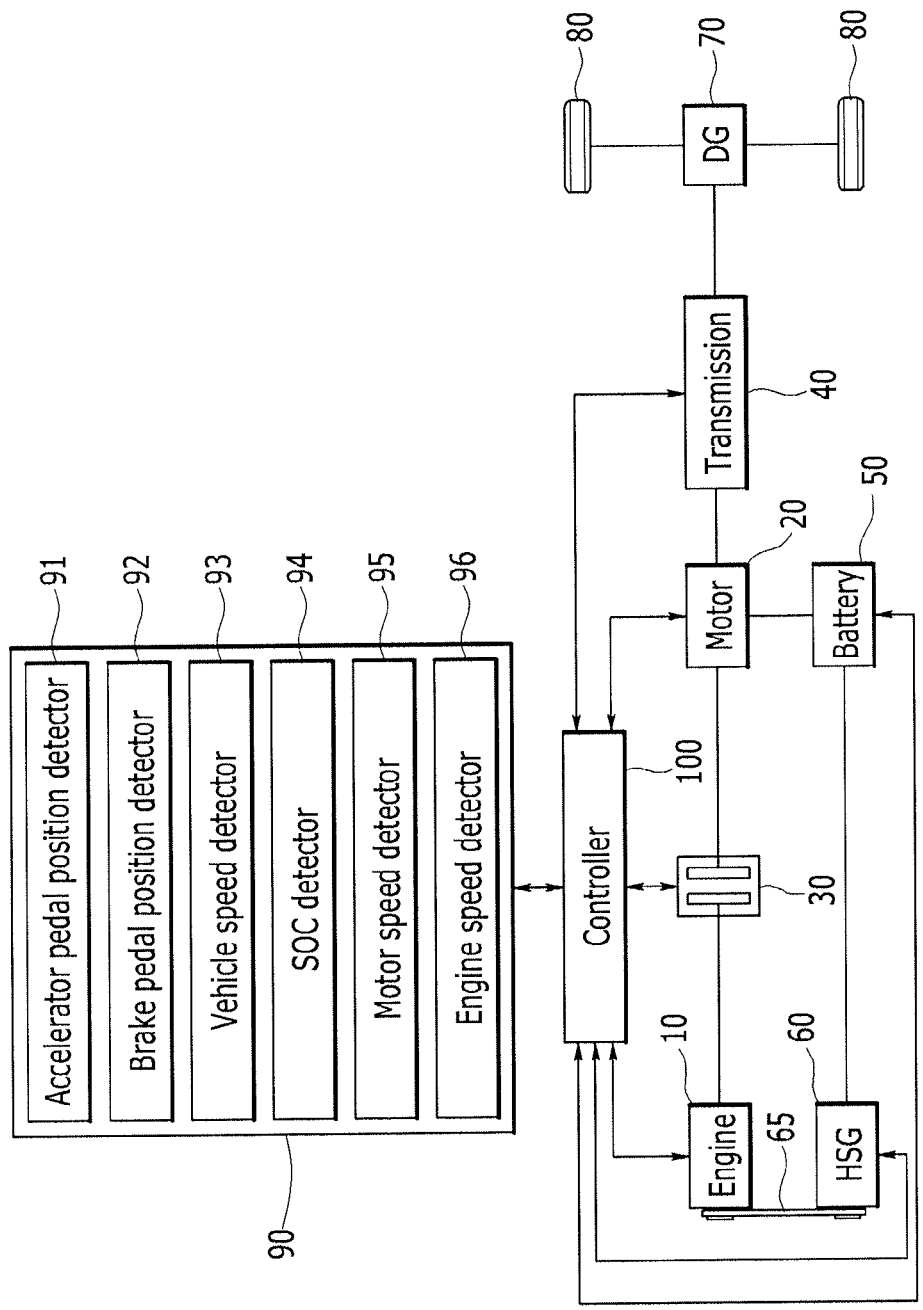
FIG. 1 is a block diagram of a hybrid electric vehicle according to embodiments of the present disclosure.

| | |
|---|---|
| 10: engine | 20: motor |
| 30: engine clutch | 40: transmission |
| 50: battery | 60: HSG |
| 70: differential gear device | 80: wheel |
| 90: data detector | 100: controller |

DETAILED DESCRIPTION OF THE EMBODIMENTS

Hereinafter, the present disclosure will be described more fully with reference to the accompanying drawings, in which embodiments of the disclosure are shown. As those skilled in the art would realize, the described embodiments may be modified in various different ways, all without departing from the spirit or scope of the present disclosure. In addition, since each component shown in the drawings is illustrated for easy description, the present disclosure is not particularly limited to the components illustrated in the drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the disclosed embodiments, FIG. 1 is a block diagram of a hybrid electric vehicle according to embodiments of the present disclosure.

As shown in FIG. 1, a hybrid electric vehicle according to the present disclosure may include an engine 10, a motor 20, an engine clutch 30 adjusting torque between the engine 10 and the motor 20, a transmission 40, a battery 50, an HSG 60, a differential gear device 70, a wheel 80, a data detector 90, and a controller 100.

The engine 10 combusts a fuel to generate torque, and various engines such as a gasoline engine, a diesel engine, and an LPI engine may be used as the engine 10. In connection with torque transmission of the hybrid electric vehicle, torque generated from the engine 10 and the motor 20 is selectively transmitted to an input shaft of the transmission 40, and torque output from an output shaft of the transmission 40 is transmitted to an axle via the differential gear device 70. The axle rotates the wheel 80 so that the hybrid electric vehicle runs by the torque generated from the engine 10 and/or the motor 20.

The battery 50 may supply electricity to the motor 20 in an electric vehicle (EV) mode and a hybrid electric vehicle (HEV) mode, and may be charged with electricity recovered through the motor 20 in a regenerative braking mode.

The HSG 60 starts the engine 10 or generates electricity according to an output of the engine 10. A belt 65 connects the HSG 60 with the engine 10.

The engine clutch 30 may be disposed between the engine 10 and the motor 20. An input shaft of the engine clutch 30 is connected to the engine 10, and an output shaft of the engine clutch 30 is connected to the motor 20.

The data detector 90 detects data for controlling the hybrid electric vehicle, and the data detected from the data detector 90 is transmitted to the controller 100. The data detector 90 may include an accelerator pedal position detector 91, a brake pedal position detector 92, a vehicle speed detector 93, an SOC detector 94, a motor speed detector 95, and an engine speed detector 96.

The accelerator pedal position detector 91 detects a position value of an accelerator pedal (i.e., pushed degree of the accelerator pedal), and transmits a signal corresponding thereto to the controller 100. When the accelerator pedal is pushed completely, the position value of the accelerator pedal is 100%, and when the accelerator pedal is not pushed, the position value of the accelerator pedal is 0%.

The brake pedal position detector 92 detects a position value of a brake pedal (i.e., pushed degree of the brake pedal) and transmits a signal corresponding thereto to the controller 100. When the brake pedal is pushed completely, the position value of the brake pedal is 100%, and when the brake pedal is not pushed, the position value of the brake pedal is 0%.

The vehicle speed detector 93 detects a vehicle speed and transmits a signal corresponding thereto to the controller 100. The vehicle speed detector 93 may be mounted at the wheel 80.

The SOC detector 94 detects an SOC of the battery 50 and transmits a signal corresponding thereto to the controller 100. Instead of directly detecting the SOC of the battery 50, a current and a voltage of the battery 50 may be measured to estimate the SOC of the battery 50.

The motor speed detector 95 detects a motor speed and transmits a signal corresponding thereto to the controller 100.

The engine speed detector 96 detects an engine speed and transmits a signal corresponding thereto to the controller 100.

The controller 100 generates a torque command based on the data detected by the data detector 90, and a torque source generates torque according to the torque command. The torque command may include an engine torque command, a motor torque command, and an HSG torque command, and the torque source may include the engine 10, the motor 20, and the HSG 60. The controller 100 may be implemented with one or more microprocessors executed by a predetermined program. The predetermined program may include a series of commands for performing each step included in a method for generating a torque command according to embodiments of the present disclosure to be described below.

Hereinafter, a method for generating a torque command according to embodiments of the present disclosure will be described in detail with reference to FIG. 2 to FIG. 6. For better comprehension and ease of description, the torque source may be the motor 20 and the torque command may be the motor torque command. embodiments of the present disclosure described based on the motor and the motor torque command can be applied to all torque sources and torque commands with a little change therein.

A method for generating a final torque command for correcting a torque loss amount will now be described with reference to FIG. 2 to FIG. 4.

Figure 2:
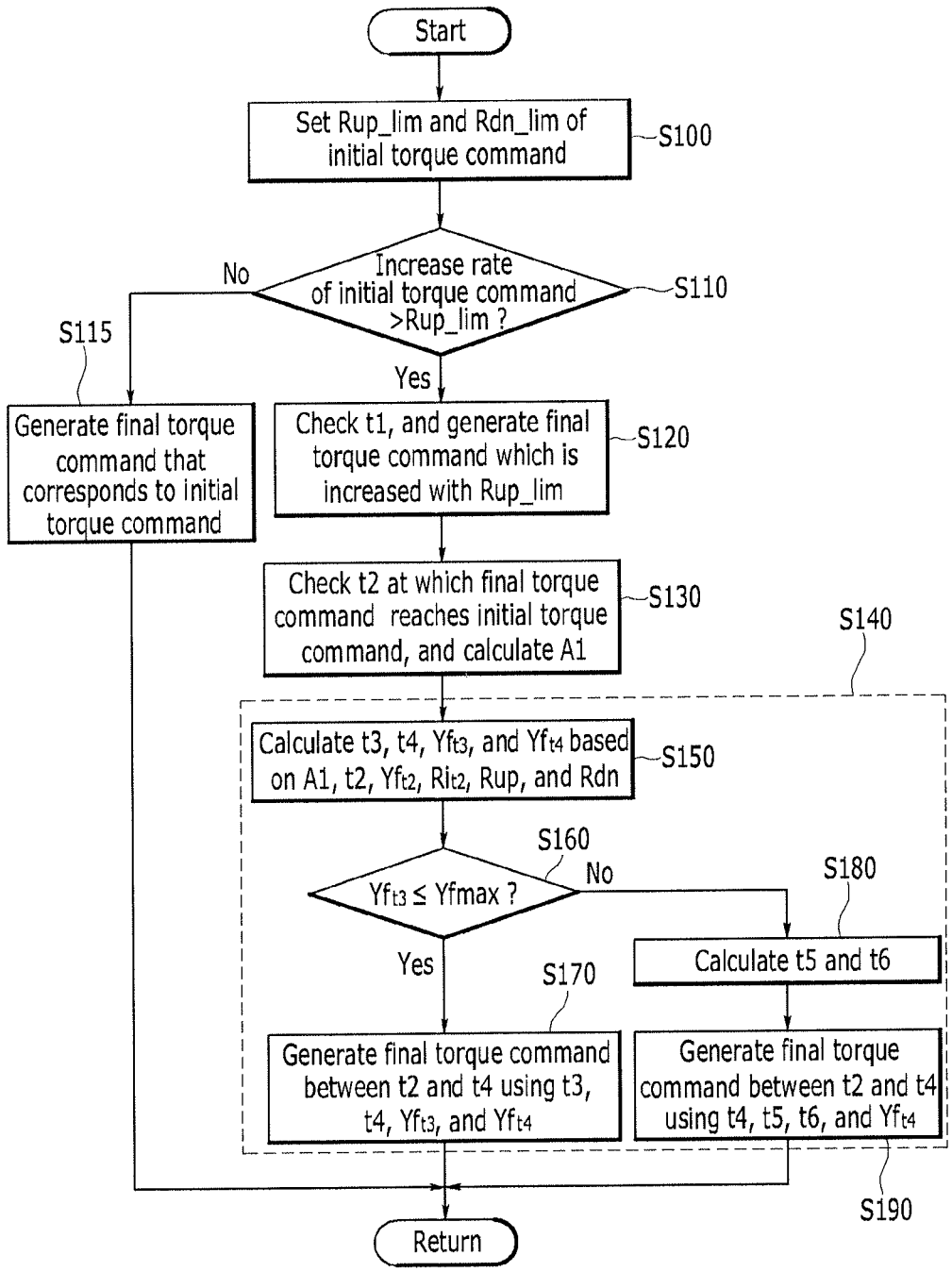
FIG. 2 is a flowchart of a method for generating a final torque command for correcting a torque loss amount according to embodiments of the present disclosure.
Figure 3:
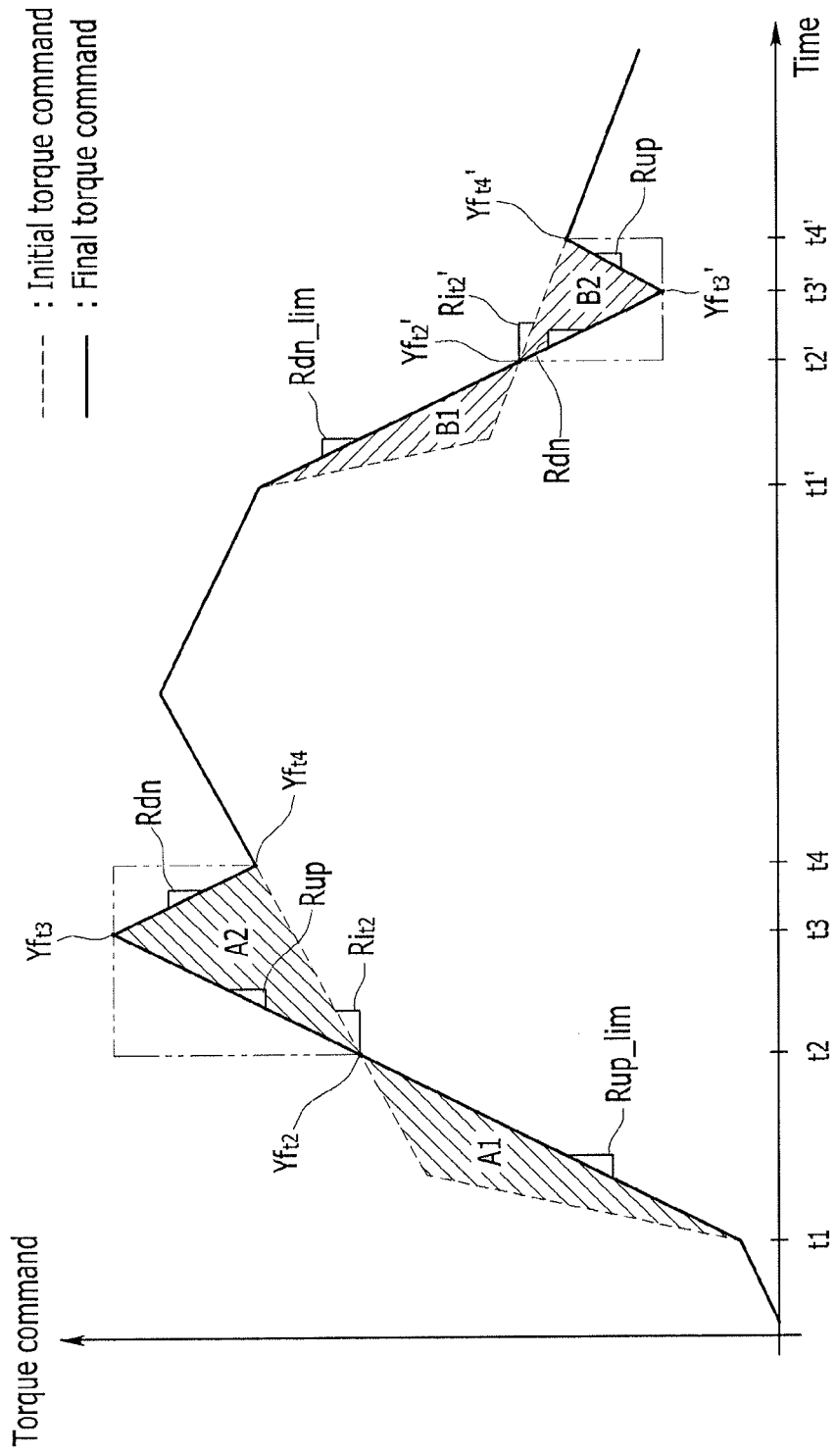
FIG. 3 is a graph illustrating an initial torque command and a final torque command according to embodiments of the present disclosure.
Figure 4:
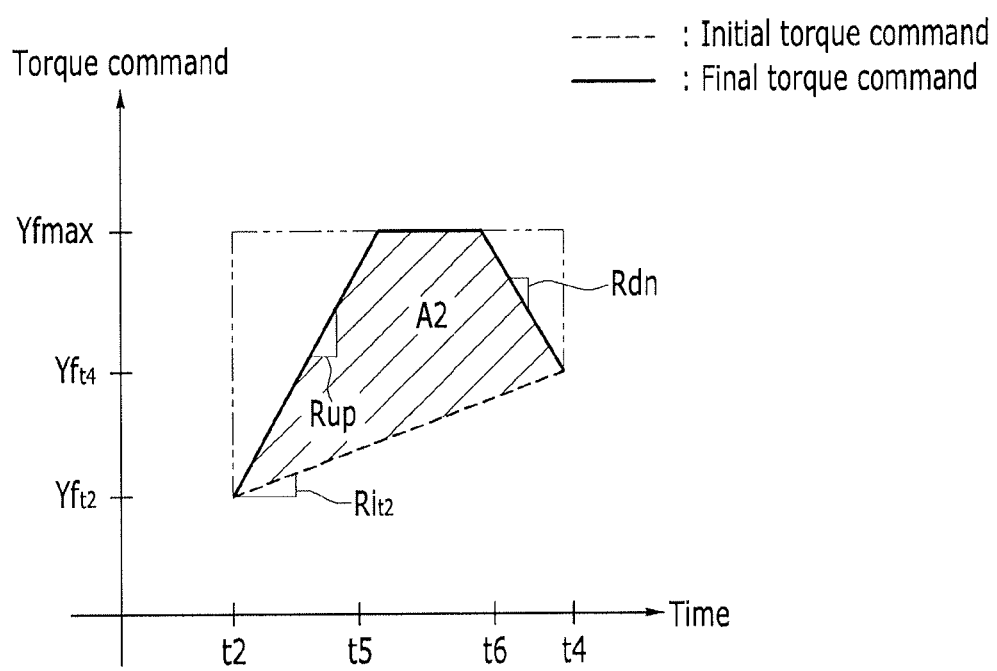
FIG. 4 is a graph illustrating a virtual quadrangle having an area corresponding to a torque loss amount according to embodiments of the present disclosure.

FIG. 2 is a flowchart of a method for generating a final torque command for correcting a torque loss amount according to embodiments of the present disclosure, FIG. 3 is a graph illustrating an initial torque command and a final torque command according to embodiments of the present disclosure, and FIG. 4 is a graph illustrating a virtual quadrangle having an area corresponding to a torque loss amount according to embodiments of the present disclosure.

As shown in FIG. 2 to FIG. 4, a method for generating a torque command for correcting a torque loss amount according to embodiments of the present disclosure begins with setting a threshold increase rate Rup_lim and a threshold decrease rate Rdn_lim of an initial torque command according to performance of the motor 20 at step S100. The threshold increase rate Rup_lim and the threshold decrease rate Rdn_lim may be previously determined to prevent the motor 20 from being damaged.

The controller 100 may calculate the initial torque command based on the position value of the accelerator pedal, the vehicle speed, and the motor speed. While generating a final torque command based on the initial torque command, the controller 100 compares an increase rate of the initial torque command with the threshold increase rate Rup_lim at step S110.

When the increase rate of the initial torque command is less than or equal to the threshold increase rate Rup_lim at step S110, the controller 100 continuously generates the final torque command that corresponds to the initial torque command at step S115. When the increase rate of the initial torque command is greater than the threshold increase rate Rup_lim at step S110, the controller 100 determines a first time t1 at which the increase rate of the initial torque command reaches the threshold increase rate Rup_lim, and then generates the final torque command which is increased with the threshold increase rate after the first time t1 at step S120. When the final torque command reaches the initial torque command after the first time t1, the controller 100 determines a second time t2 at which the final torque command reaches the initial torque command, and then calculates a torque loss amount A1 between the first time t1 and the second time t2 at step S130.

The controller 100 generates the final torque command for correcting the torque loss amount A1 after the second time t2 at step S140. In detail, the controller 100 may calculate a third time t3 after the second time t2, a fourth time t4 at which the final torque command reaches the initial torque command after the third time t3, the final torque command $Yf_{t3}$ at the third time t3, and the final torque command $Yf_{t4}$ at the fourth time t4 based on the torque loss amount A1, the second time t2, the final torque command $Yf_{t2}$ at the second time t2, a change rate $Ri_{t2}$ of the initial torque command at the second time t2, a preset increase rate Rup, and a preset decrease rate Rdn at step S150. The preset increase rate Rup and the preset decrease rate Rdn may be set by a person of ordinary skill in the art in consideration of the performance of the motor 20. The preset increase rate Rup needs to be less than or equal to the threshold increase rate Rup_lim, and the preset decrease rate Rdn needs to be greater than or equal to the threshold decrease rate Rdn_lim. In particular, the preset increase rate Rup may be the same as the threshold increase rate Rup_lim, and the preset decrease rate Rdn may be the same as the threshold decrease rate Rdn_lim.

In this case, as shown in FIG. 3, the controller 100 may form a virtual triangle having an area A2 corresponding to the torque loss amount A1 based on the second time t2, the third time t3, the fourth time t4, the final torque command $Yf_{t2}$ at the second time t2, the final torque command $Yf_{t3}$ at the third time t3, and the final torque command $Yf_{t4}$ at the fourth time t4.

The area A2 of the virtual triangle may be expressed by Equation 1 below.

$$A2 = \tfrac{1}{2}(2Yf_{t3} - Yf_{t4} - Yf_{t2})(t4 - t2) - \tfrac{1}{2}(Yf_{t3} - Yf_{t2})(t3 - t2) - \tfrac{1}{2}(Yf_{t3} - Yf_{t4})(t3 - t3)$$

[Equation 1]

The preset increase rate Rup may be expressed by Equation 2 below.

$$Rup = \frac{Yf_{t3} - Yf_{t2}}{t3 - t2} \quad \text{[Equation 2]}$$

The preset decrease rate Rdn may be expressed by Equation 3 below.

$$Rdn = \frac{Yf_{t4} - Yf_{t3}}{t4 - t3} \quad \text{[Equation 3]}$$

The change rate $Ri_{t2}$ of the initial torque command at the second time t2 may be expressed by Equation 4 below.

$$Ri_{t2} = \frac{Yf_{t4} - Yf_{t2}}{t4 - t2} \quad \text{[Equation 4]}$$

Since the area A2 corresponding to the torque loss amount A1, the second time t2, the final torque command $Yf_{t2}$ at the second time t2, the change rate $Ri_{t2}$ of the initial torque command at the second time t2, the preset increase rate Rup, and the preset decrease rate Rdn are determined previously, the controller 100 may determine the third time t3, the fourth time t4, the final torque command $Yf_{t3}$ at the third time t3, and the final torque command $Yf_{t4}$ at the fourth time t4 which are four unknown values in Equation 1 to Equation 4.

The controller 100 compares the final torque command $Yf_{t3}$ at the third time t3 with a maximum allowable torque command Yfmax at step S160. The maximum allowable torque command Yfmax may be set by a person of ordinary skill in the art in consideration of a maximum torque that can be output by the motor 20.

When the final torque command $Yf_{t3}$ at the third time t3 is less than or equal to the maximum allowable torque command Yfmax at the S160, the controller 100 generates the final torque command between the second time t2 and the fourth time t4 using the third time t3, the fourth time t4, the final torque command $Yf_{t3}$ at the third time t3, and the final torque command $Yf_{t4}$ at the fourth time t4 at step S170. In detail, as shown in FIG. 3, the controller 100 generates the final torque command which is increased with the preset increase rate Rup between the second time t2 and the third time t3. After that, the controller 100 generates the final torque command which is decreased with the preset decrease rate Rdn between the third time t3 and the fourth time t4. As a result, the controller 100 may generate the final torque command which is capable of correcting the torque loss amount A1 between the second time t2 and the fourth time t4.

When the final torque command $Yf_{t3}$ at the third time t3 is greater than the maximum allowable torque command Yfmax at step S160, the controller 100 calculates a fifth time t5 at which the final torque command reaches the maximum allowable torque command Yfmax and a sixth time t6 between the third time t3 and the fourth time t4 at step S180. In this case, as shown in FIG. 4, the controller 100 may form a virtual quadrangle having an area A2 corresponding to the torque loss amount A1 based on the second time t2, the fourth time t4, the fifth time t5, the sixth time t6, the final torque command $Yf_{t2}$ at the second time t2, the maximum allowable torque command Yfmax, and the final torque command $Yf_{t4}$ at the fourth time t4.

The area A2 of the virtual quadrangle may be expressed by Equation 5 below.

$$A2 = \tfrac{1}{2}(2Yf_{max} - Yf_{t4} - Yf_{t2})(t4 - t2) - \tfrac{1}{2}(Yf_{max} - Yf_{t2})(t5 - t2) - \tfrac{1}{2}(Yf_{max} - Yf_{t4})(t4 - t6) \quad \text{[Equation 5]}$$

The preset increase rate Rup may be expressed by Equation 6 below.

$$Rup = \frac{Yf_{max} - Yf_{t2}}{t5 - t2} \quad \text{[Equation 6]}$$

The preset decrease rate Rdn may be expressed by Equation 7 below.

$$Rdn = \frac{Yf_{t4} - Yf_{max}}{t4 - t6} \quad \text{[Equation 7]}$$

The change rate $Ri_{t2}$ of the initial torque command at the second time t2 may be expressed by Equation 8 below.

$$Ri_{t2} = \frac{Yf_{t4} - Yf_{t2}}{t4 - t2} \quad \text{[Equation 8]}$$

Since the area A2 corresponding to the torque loss amount A1, the second time t2, the final torque command $Yf_{t2}$ at the second time t2, the change rate $Ri_{t2}$ of the initial torque command at the second time t2, the preset increase rate Rup, the preset decrease rate Rdn, and the maximum allowable torque command Yfmax are determined previously, the controller 100 may determine the fourth time t4, the fifth time t5, the sixth time t6, and the final torque command $Yf_{t4}$ at the fourth time t4 which are four unknown values in Equation 5 to Equation 8.

The controller 100 generates the final torque command between the second time t2 and the fourth time t4 using the fourth time t4, the fifth time t5, the sixth time t6, and the final torque command $Yf_{t4}$ at the fourth time t4 at step S190. In detail, as shown in FIG. 4, the controller 100 generates the final torque command which is increased with the preset increase rate Rup between the second time t2 and the fifth time t5. After that, the controller 100 generates the final torque command which corresponds to the maximum allowable torque command Yfmax between the fifth time t5 and the sixth time t6. After that, the controller 100 generates the final torque command which is decreased with the preset decrease rate Rdn between the sixth time t6 and the fourth time t4. As a result, the controller 100 may generate the final torque command which is capable of correcting the torque loss amount A1 between the second time 2 and the fourth time t4.

Hereinafter, a method for generating a final torque command for correcting a torque excess amount will be described with reference to FIG. 3, FIG. 5, and FIG. 6. A method for generating a final torque command for correcting a torque excess amount according to embodiments of the present disclosure may be performed similarly to the method for generating the final torque command for correcting the torque loss amount.

Figure 5:
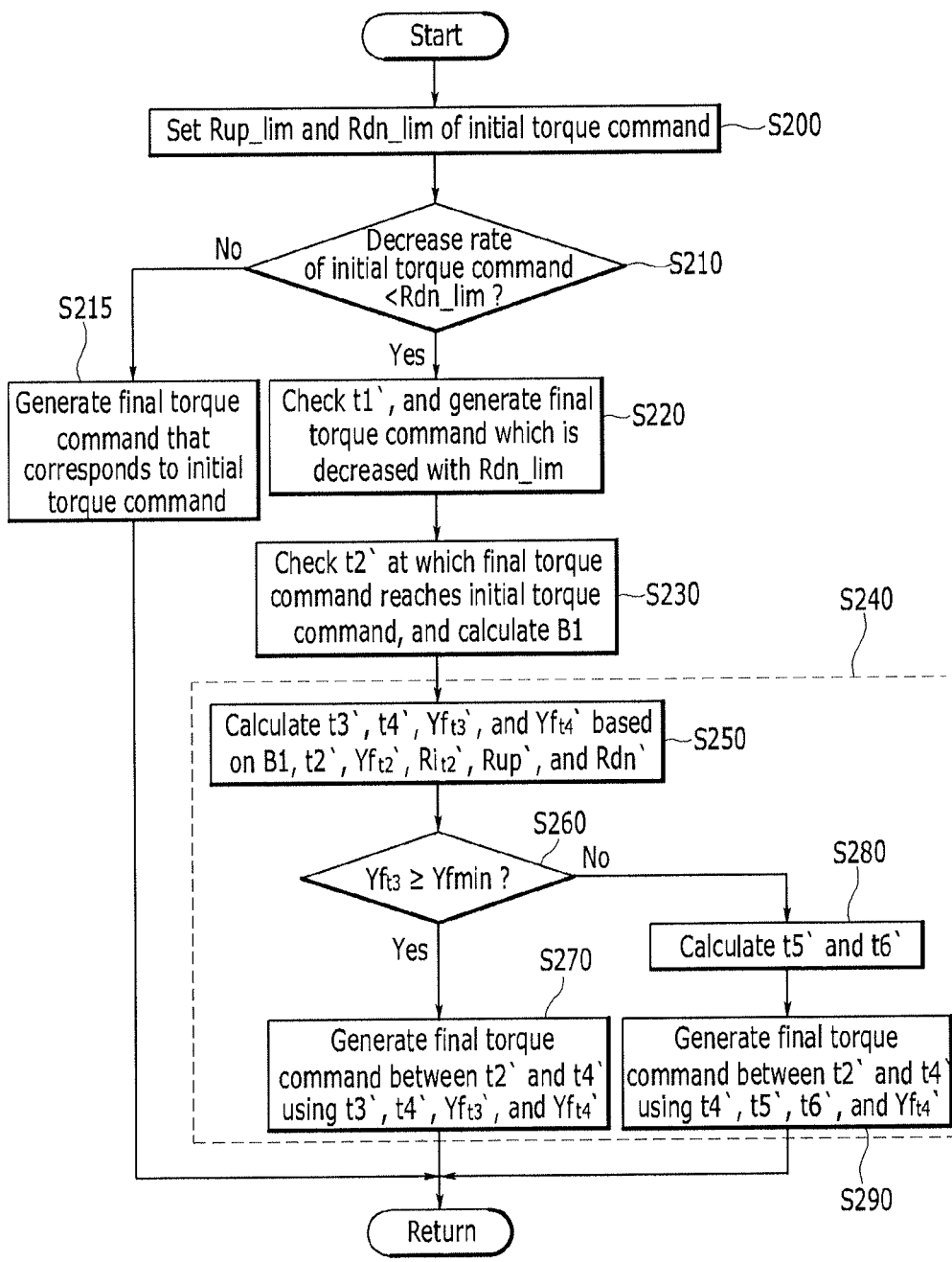
FIG. 5 is a flowchart of a method for generating a final torque command for correcting a torque excess amount according to embodiments of the present disclosure.
Figure 6:
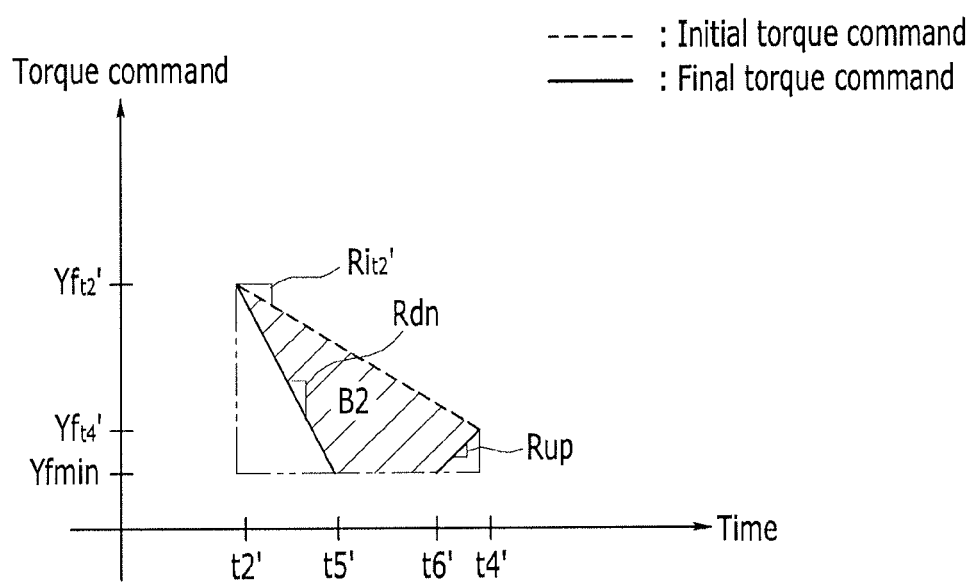
FIG. 6 is a graph illustrating a virtual quadrangle having an area corresponding to a torque excess amount according to embodiments of the present disclosure.
Figure 7:
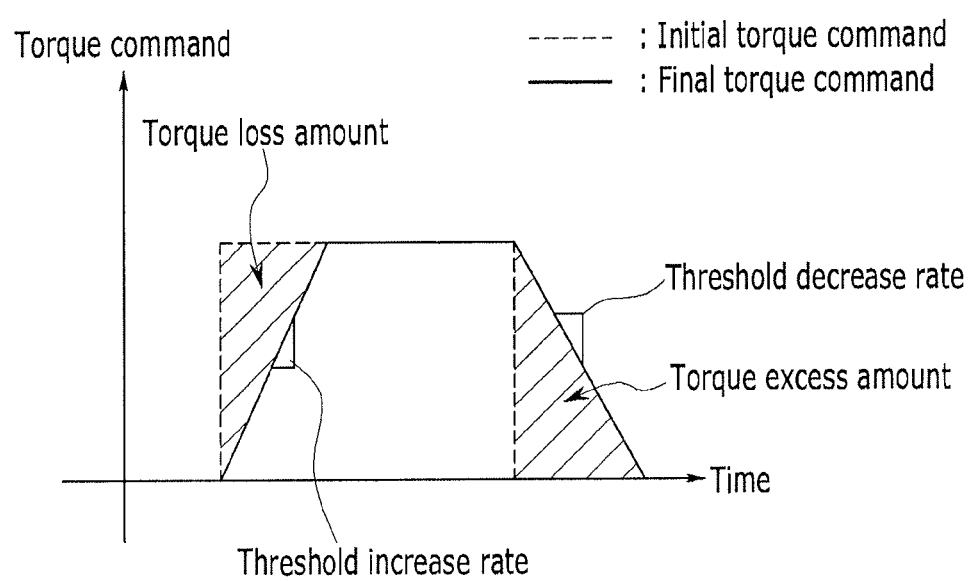
FIG. 7 is a graph illustrating a conventional HSG torque command.

FIG. 5 is a flowchart of a method for generating a final torque command for correcting a torque excess amount according to embodiments of the present disclosure, and FIG. 6 is a graph illustrating a virtual quadrangle having an area corresponding to a torque excess amount according to embodiments of the present disclosure.

As shown in FIG. 3, FIG. 5, and FIG. 6, a method for generating a torque command for correcting a torque excess amount according to embodiments of the present disclosure begins with setting the threshold increase rate Rup_lim and the threshold decrease rate Rdn_lim of an initial torque command according to performance of the motor 20 at step S200.

While generating a final torque command based on the initial torque command, the controller 100 compares a decrease rate of the initial torque command with the threshold decrease rate Rdn_lim at step S210.

When the decrease rate of the initial torque command is greater than or equal to the threshold decrease rate Rdn_lim at step S210, the controller 100 continuously generates the final torque command that corresponds to the initial torque command at step S215.

When the decrease rate of the initial torque command is less than the threshold decrease rate Rdn_lim at step S210, the controller 100 determines a first time t1' at which the decrease rate of the initial torque command reaches the threshold decrease rate Rdn_lim, and then generates the final torque command which is decreased with the threshold decrease rate after the first time t1' at step S220.

When the final torque command reaches the initial torque command after the first time t1', the controller 100 determines a second time t2' at which the final torque command reaches the initial torque command, and then calculates a torque excess amount B1 between the first time t1' and the second time t2' at step S230.

The controller 100 generates the final torque command for correcting the torque excess amount B1 after the second time t2' at step S240. In detail, the controller 100 may calculate a third time t3' after the second time t2', a fourth time t4' at which the final torque command reaches the initial torque command after the third time t3', the final torque command Yf$_{t3}$' at the third time t3', and the final torque command Yf$_{t4}$' at the fourth time t4' based on the torque excess amount B1, the second time t2', the final torque command Yf$_{t2}$' at the second time t2', a change rate Ri$_{t2}$' of the initial torque command at the second time t2', the preset increase rate Rup, and the preset increase rate Rdn at step S250. In this case, as shown in FIG. 3, the controller 100 may form a virtual triangle having an area B2 corresponding to the torque excess amount B1 based on the second time t2', the third time t3', the fourth time t4', the final torque command Yf$_{t2}$' at the second time t2', the final torque command Yf$_{t3}$' at the third time t3', and the final torque command Yf$_{t4}$' at the fourth time t4'.

The area B2 of the virtual triangle may be expressed by Equation 9 below.

$$B2 = \tfrac{1}{2}(Yf_{t4}' + Yf_{t2}' - 2Yf_{t3}')(t4' - t2') - \tfrac{1}{2}(Yf_{t2}' - Yf_{t3}')(t3' - t2') - \tfrac{1}{2}(Yf_{t4}' - Yf_{t3}')(t4' - t3')$$ [Equation 9]

The preset increase rate Rup may be expressed by Equation 10 below.

$$Rup = \frac{Yf_{t4}' - Yf_{t3}'}{t4' - t3'}$$ [Equation 10]

The preset decrease rate Rdn may be expressed by Equation 11 below.

$$Rdn = \frac{Yf_{t3}' - Yf_{t2}'}{t3' - t2'}$$ [Equation 11]

The change rate Ri$_{t2}$' of the initial torque command at the second time t2' may be expressed by Equation 12 below.

$$Ri_{t2}' = \frac{Yf_{t4}' - Yf_{t2}'}{t4' - t2'}$$ [Equation 12]

Since the area B2 corresponding to the torque excess amount B1, the second time t2', the final torque command Yf$_{t2}$' at the second time t2', the change rate Ri$_{t2}$' of the initial torque command at the second time t2', the preset increase rate Rup, and the preset decrease rate Rdn are determined previously, the controller 100 may determine the third time t3', the fourth time t4', the final torque command Yf$_{t3}$' at the third time t3', and the final torque command Yf$_{t4}$' at the fourth time t4' which are four unknown values in Equation 9 to Equation 12.

The controller 100 compares the final torque command Yf$_{t3}$' at the third time t3' with a minimum allowable torque command Yfmin at step S260. The minimum allowable torque command Yfmin may be set by a person of ordinary skill in the art in consideration of a minimum torque that can be output by the motor 20.

When the final torque command Yf$_{t3}$' at the third time t3' is greater than or equal to the minimum allowable torque command Yfmin at step S260, the controller 100 generates the final torque command between the second time t2' and the fourth time t4' using the third time t3', the fourth time t4', the final torque command Yf$_{t3}$' at third time t3', and the final torque command Yf$_{t4}$' at the fourth time t4' at step S270. In detail, as shown in FIG. 3, the controller 100 generates the final torque command which is decreased with the preset decrease rate Rdn between the second time t2' and the third time t3'. After that, the controller 100 generates the final torque command which is increased with the preset increase rate Rup between the third time t3' and the fourth time t4'. As a result, the controller 100 may generate the final torque command which is capable of correcting the torque excess amount B1 between the second time t2' and the fourth time t4'.

When the final torque command Yf$_{t3}$' at the third time t3' is less than the minimum allowable torque command Yfmin at step S260, the controller 100 calculates a fifth time t5' at which the final torque command reaches the minimum allowable torque command Yfmin and a sixth time t6' between the third time t3' and the fourth time t4' at step S280.

In this case, as shown in FIG. 6, the controller 100 may form a virtual quadrangle having an area B2 corresponding to the torque excess amount B1 based on the second time t2', the fourth time t4', the fifth time t5', the sixth time t6', the final torque command Yf$_{t2}$' at the second time t2', the minimum allowable torque command Yfmin, and the final torque command Yf$_{t4}$' at the fourth time t4'.

The area B2 of the virtual quadrangle may be expressed by Equation 13 below.

$$B2 = \tfrac{1}{2}(Yf_{t4}' + Yf_{t2}' - 2Yf_{min})(t4' - t2') - \tfrac{1}{2}(Yf_{t2}' - Yf_{min})(t5' - t2') - \tfrac{1}{2}(Yf_{t4}' - Yf_{min})(t4' - t6')$$ [Equation 13]

The preset increase rate Rup may be expressed by Equation 14 below.

$$Rup = \frac{Yf'_{t4} - Yf'_{min}}{t4' - t6'} \quad \text{[Equation 14]}$$

The preset decrease rate Rdn may be expressed by Equation 15 below.

$$Rdn = \frac{Yf'_{min} - Yf'_{t2}}{t5' - t2'} \quad \text{[Equation 15]}$$

The change rate $Ri_{t2}'$ of the initial torque command at the second time t2' may be expressed by Equation 16 below.

$$Ri'_{t2} = \frac{Yf'_{t4} - Yf'_{t2}}{t4' - t2'} \quad \text{[Equation 16]}$$

Since the area B2 corresponding to the torque excess amount B1, the second time t2', the final torque command $Yf_{t2}'$ at the second time t2', the change rate $Ri_{t2}'$ of the initial torque command at the second time t2', the preset increase rate Rup, the preset decrease rate Rdn, and the minimum allowable torque command Yfmin are determined previously, the controller 100 may determine the fourth time t4', the fifth time t5', the sixth time t6', and the final torque command $Yf_{t4}'$ at the fourth time t4' which are four unknown values in Equation 13 to Equation 16.

The controller 100 generates the final torque command between the second time t2' and the fourth time t4' using the fourth time t4', the fifth time t5', the sixth time t6', and the final torque command $Yf_{t4}'$ at the fourth time t4' at step S290. In detail, as shown in FIG. 6, the controller 100 generates the final torque command which is decreased with the preset decrease rate Rdn between the second time t2' and the fifth time t5'. After that, the controller 100 generates the final torque command which corresponds to the minimum allowable torque command Yfmin between the fifth time t5' and the sixth time t6'. After that, the controller 100 generates the final torque command which is increased with the preset increase rate Rup between the sixth time t6' and the fourth time t4'. As a result, the controller 100 may generate the final torque command which is capable of correcting the torque excess amount B1 between the second time t2' and the fourth time t4'.

As described above, according to embodiments of the present disclosure, torque commands that are capable of correcting the torque loss amount A1 and the torque excess amount B1 due to the threshold increase rate Rup_lim and the threshold decrease rate Rdn_lim may be generated. Accordingly, superior performance of the torque source can be achieved.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A method for generating torque commands, comprising:
    setting, by a controller including a memory and a processor, a threshold increase rate and a threshold decrease rate of an initial torque command according to performance of a torque source;
    comparing, by the controller, an increase rate of the initial torque command with the threshold increase rate, while generating a final torque command based on the initial torque command;
    determining, by the controller, a first time at which the increase rate of the initial torque command reaches the threshold increase rate, and setting the final torque command so as to increase according to the threshold increase rate after the first time, when the increase rate of the initial torque command is greater than the threshold increase rate;
    determining, by the controller, a second time at which the final torque command reaches the initial torque command, and calculating a torque loss amount between the first time and the second time, when the final torque command reaches the initial torque command after the first time; and
    setting, by the controller, the final torque command so as to correct the torque loss amount after the second time,
    wherein the torque source generates torque according to the final torque command.

2. The method of claim 1, wherein the setting of the final torque command so as to correct the torque loss amount after the second time comprises:
    calculating, by the controller, i) a third time after the second time, ii) a fourth time at which the final torque command reaches the initial torque command after the third time, iii) the final torque command at the third time, and iv) the final torque command at the fourth time, based on the torque loss amount, the second time, the final torque command at the second time, a change rate of the initial torque command at the second time, a preset increase rate, and a preset decrease rate;
    comparing, by the controller, the final torque command at the third time with a maximum allowable torque command; and
    setting, by the controller, the final torque command between the second time and the fourth time based on the third time, the fourth time, the final torque command at the third time, and the final torque command at the fourth time, when the final torque command at the third time is less than or equal to the maximum allowable torque command.

3. The method of claim 2, wherein the calculating of the third time after the second time, the fourth time at which the final torque command reaches the initial torque command after the third time, the final torque command at the third time, and the final torque command at the fourth time comprises:
    forming, by the controller, a virtual triangle having an area corresponding to the torque loss amount based on the second time, the third time, the fourth time, the final torque command at the second time, the final torque command at the third time, and the final torque command at the fourth time.

4. The method of claim 2, wherein the setting of the final torque command between the second time and the fourth time using the third time, the fourth time, the final torque command at the third time, and the final torque command at the fourth time comprises:

setting, by the controller, the final torque command so as to increase according to the preset increase rate between the second time and the third time; and setting, by the controller, the final torque command so as to decrease according to the preset decrease rate between the third time and the fourth time.

5. The method of claim 2, wherein the preset increase rate is the same as the threshold increase rate.

6. The method of claim 2, wherein the preset decrease rate is the same as the threshold decrease rate.

7. The method of claim 2, wherein the setting of the final torque command so as to correct the torque loss amount after the second time further comprises:

calculating, by the controller, a fifth time at which the final torque command reaches the maximum allowable torque command and a sixth time between the third time and the fourth time, when the final torque command at the third time is greater than the maximum allowable torque command; and setting, by the controller, the final torque command between the second time and the fourth time based on the fourth time, the fifth time, the sixth time, and the final torque command at the fourth time.

8. The method of claim 7, wherein the calculating of the fifth time at which the final torque command reaches the maximum allowable torque command and the sixth time between the third time and the fourth time comprises:

forming, by the controller, a virtual quadrangle having an area corresponding to the torque loss amount based on the second time, the fourth time, the fifth time, the sixth time, the final torque command at the second time, the maximum allowable torque command, and the final torque command at the fourth time.

9. The method of claim 7, wherein the setting of the final torque command between the second time and the fourth time based on the fourth time, the fifth time, the sixth time, and the final torque command at the fourth time comprises:

setting, by the controller, the final torque command so as to increase according to the preset increase rate between the second time and the fifth time;

setting, by the controller, the final torque command so as to correspond to the maximum allowable torque command between the fifth time and the sixth time; and setting, by the controller, the final torque command so as to decrease according to the preset decrease rate between the sixth time and the fourth time.

10. A method for generating torque commands, comprising:

setting, by a controller including a memory and a processor, a threshold increase rate and a threshold decrease rate of an initial torque command according to performance of a torque source;

comparing, by the controller, a decrease rate of the initial torque command with the threshold decrease rate, while generating a final torque command based on the initial torque command;

determining, by the controller, a first time at which the decrease rate of the initial torque command reaches the threshold decrease rate, and setting the final torque command so as to decrease according to the threshold decrease rate after the first time, when the decrease rate of the initial torque command is less than the threshold decrease rate;

determining, by the controller, a second time at which the final torque command reaches the initial torque command, and calculating a torque excess amount between the first time and the second time, when the final torque command reaches the initial torque command after the first time; and setting, by the controller, the final torque command so as to correct the torque excess amount after the second time, wherein the torque source generates torque according to the final torque command.

11. The method of claim 10, wherein the setting of the final torque command so as to correct the torque excess amount after the second time comprises:

calculating, by the controller, i) a third time after the second time, ii) a fourth time at which the final torque command reaches the initial torque command after the third time, iii) the final torque command at the third time, and iv) the final torque command at the fourth time, based on the torque excess amount, the second time, the final torque command at the second time, a change rate of the initial torque command at the second time, a preset increase rate, and a preset decrease rate;

comparing, by the controller, the final torque command at the third time with a minimum allowable torque command; and setting, by the controller, the final torque command between the second time and the fourth time based on the third time, the fourth time, the final torque command at the third time, and the final torque command at the fourth time, when the final torque command at the third time is greater than or equal to the minimum allowable torque command.

12. The method of claim 11, wherein the calculating of the third time after the second time, the fourth time at which the final torque command reaches the initial torque command after the third time, the final torque command at the third time, and the final torque command at the fourth time comprises:

forming, by the controller, a virtual triangle having an area corresponding to the torque excess amount based on the second time, the third time, the fourth time, the final torque command at the second time, the final torque command at the third time, and the final torque command at the fourth time.

13. The method of claim 11, wherein the setting of the final torque between the second time and the fourth time using the third time, the fourth time, the final torque command at the third time, and the final torque command at the fourth time comprises:

setting, by the controller, the final torque command so as to decrease according to the preset decrease rate between the second time and the third time; and setting, by the controller, the final torque command so as to increase according to the preset increase rate between the third time and the fourth time.

14. The method of claim 11, wherein the preset increase rate is the same as the threshold increase rate.

15. The method of claim 11, wherein the preset decrease rate is the same as the threshold decrease rate.

16. The method of claim 11, wherein the setting of the final torque command so as to correct the torque excess amount after the second time further comprises:

calculating, by the controller, a fifth time at which the final torque command reaches the minimum allowable torque command and a sixth time between the third time and the fourth time, when the final torque command at the third time is less than the minimum allowable torque command; and setting by the controller, the final torque command between the second time and the fourth time based on fourth time, the fifth time, the sixth time, and the final torque command at the fourth time.

17. The method of claim 16, wherein the calculating of the fifth time at which the final torque command reaches the minimum allowable torque command and the sixth time between the third time and the fourth time comprises:

forming, by the controller, a virtual quadrangle having an area corresponding to the torque excess amount based on the second time, the fourth time, the fifth time, the sixth time, the final torque command at the second time, the minimum allowable torque command, and the final torque command at the fourth time.

18. The method of claim 16, wherein the setting of the final torque command between the second time and the fourth time based on the fourth time, the fifth time, the sixth time, and the final torque command at the fourth time comprises:

setting, by the controller, the final torque command so as to decrease according to the preset decrease rate between the second time and the fifth time;

setting, by the controller, the final torque command so as to correspond to the minimum allowable torque command between the fifth time and the sixth time; and setting, by the controller, the final torque command so as to increase according to the preset increase rate between the sixth time and the fourth time.

19. An apparatus for generating torque commands, comprising:

a data detector detecting data for generating torque commands; and a controller, including a memory and a processor, executing a predetermined program to control a torque source based on the detected data, wherein the predetermined program embodies a series of commands for performing a method for generating the torque commands including:

setting a threshold increase rate and a threshold decrease rate of an initial torque command according to performance of the torque source;

comparing an increase rate of the initial torque command with the threshold increase rate, while generating a final torque command based on the initial torque command;

determining a first time at which the increase rate of the initial torque command reaches the threshold increase rate, and setting the final torque command so as to increase according to the threshold increase rate after the first time, when the increase rate of the initial torque command is greater than the threshold increase rate;

determining a second time at which the final torque command reaches the initial torque command, and calculating a torque loss amount between the first time and the second time, when the final torque command reaches the initial torque command after the first time; and the final torque command so as to correct the torque loss amount after the second time, wherein the torque source generates torque according to the final torque command.

20. An apparatus for generating torque commands, comprising:

a data detector detecting data for generating torque commands; and a controller, including a memory and a processor, executing a predetermined program to control a torque source based on the detected data, wherein the predetermined program embodies a series of commands for performing a method for generating the torque commands including:

setting a threshold increase rate and a threshold decrease rate of an initial torque command according to performance of the torque source;

comparing a decrease rate of the initial torque command with the threshold decrease rate, while generating a final torque command based on the initial torque command;

determining a first time at which the decrease rate of the initial torque command reaches the threshold decrease rate, and setting the final torque command so as to decrease according to the threshold decrease rate after the first time, when the decrease rate of the initial torque command is less than the threshold decrease rate;

determining a second time at which the final torque command reaches the initial torque command, and calculating a torque excess amount between the first time and the second time, when the final torque command reaches the initial torque command after the first time; and setting final torque command so as to correct the torque excess amount after the second time, wherein the torque source generates torque according to the final torque command.

* * * * *